United States Patent
Levenets et al.

(10) Patent No.: US 8,017,899 B2
(45) Date of Patent: Sep. 13, 2011

(54) CODED APERTURE IMAGING USING SUCCESSIVE IMAGING OF A REFERENCE OBJECT AT DIFFERENT POSITIONS

(75) Inventors: Douglas Alan Levenets, Malvern (GB); Keith Loder Lewis, Worcestershire (GB); Christopher William Slinger, Worcestershire (GB)

(73) Assignee: Qinetiq Limited, London (GB)

( * ) Notice: Subject to any disclaimer, the term of this patent is extended or adjusted under 35 U.S.C. 154(b) by 0 days.

(21) Appl. No.: 12/278,528

(22) PCT Filed: Feb. 6, 2007

(86) PCT No.: PCT/GB2007/000403
§ 371 (c)(1),
(2), (4) Date: Aug. 6, 2008

(87) PCT Pub. No.: WO2007/091045
PCT Pub. Date: Aug. 16, 2007

(65) Prior Publication Data
US 2009/0090868 A1    Apr. 9, 2009

(30) Foreign Application Priority Data
Feb. 6, 2006    (GB) .................................. 0602373.3

(51) Int. Cl.
*H01L 27/00* (2006.01)
*H01J 3/14* (2006.01)
*G01T 1/161* (2006.01)

(52) U.S. Cl. .................. 250/208.1; 250/216; 250/363.06

(58) Field of Classification Search ............... 250/208.1, 250/216, 237 R, 363.02–363.06
See application file for complete search history.

(56) References Cited

U.S. PATENT DOCUMENTS

| | | | |
|---|---|---|---|
| 3,860,821 | A | 1/1975 | Barrett |
| 3,961,191 | A | 6/1976 | Stoner et al. |
| 4,075,483 | A | 2/1978 | Tancrell et al. |

(Continued)

FOREIGN PATENT DOCUMENTS

DE    25 28 641 A1    1/1976

(Continued)

OTHER PUBLICATIONS

Ivanov, O.P., "Control and image decoding software for portable gamma-ray imaging system with coded aperture", Oct. 1999, Nuclear Science Symposium 1999. Conference Record. 1999 IEEE, vol. 1, pp. 459-463.*

(Continued)

*Primary Examiner* — Thanh X Luu
(74) *Attorney, Agent, or Firm* — Oliff & Berridge PLC (57) ABSTRACT

In coded aperture imaging knowledge of the coded array pattern and its positional relation to the detector array is needed in order to be able to reconstruct the scene image. Usually a theoretical model of the coded array is used and the actual array needs to be aligned accurately with respect to the detector. The present invention uses a coded aperture imager to image a reference object in the scene and uses the intensity pattern on the detector array to determine the decoding pattern corresponding to the coded aperture array. The reference object may be a point source in which case the pattern on the detector array may be used directly as the decoding pattern or it may be used to correct a theoretical pattern for any misalignment.

20 Claims, 3 Drawing Sheets

U.S. PATENT DOCUMENTS

| | | | |
|---|---|---|---|
| 4,092,540 A | 5/1978 | Barrett |
| 4,165,462 A | 8/1979 | Macovski et al. |
| 4,209,780 A | 6/1980 | Fenimore et al. |
| 4,954,789 A | 9/1990 | Sampsell |
| 5,047,822 A | 9/1991 | Little, Jr. et al. |
| 5,115,335 A | 5/1992 | Soref |
| 5,294,971 A | 3/1994 | Braunecker et al. |
| 5,311,360 A | 5/1994 | Bloom et al. |
| 5,426,312 A | 6/1995 | Whitehead |
| 5,448,395 A | 9/1995 | Lopez et al. |
| 5,488,504 A | 1/1996 | Worchesky et al. |
| 5,500,761 A | 3/1996 | Goossen et al. |
| 5,519,529 A | 5/1996 | Ahearn et al. |
| 5,552,912 A | 9/1996 | Sharp et al. |
| 5,579,149 A | 11/1996 | Moret et al. |
| 5,636,001 A | 6/1997 | Collier |
| 5,636,052 A | 6/1997 | Arney et al. |
| 5,710,656 A | 1/1998 | Goossen |
| 5,772,598 A | 6/1998 | Halling |
| 5,784,189 A | 7/1998 | Bozler et al. |
| 5,825,528 A | 10/1998 | Goossen |
| 5,838,484 A | 11/1998 | Goossen |
| 5,841,579 A | 11/1998 | Bloom et al. |
| 5,870,221 A | 2/1999 | Goossen |
| 5,943,155 A | 8/1999 | Goossen |
| 5,949,571 A | 9/1999 | Goossen et al. |
| 5,953,161 A | 9/1999 | Troxell et al. |
| 5,995,251 A | 11/1999 | Hesselink et al. |
| 6,034,807 A | 3/2000 | Little et al. |
| 6,069,361 A | 5/2000 | Rubinstein |
| 6,195,412 B1 | 2/2001 | Tobin, Jr. et al. |
| 6,324,192 B1 | 11/2001 | Tayebati |
| 6,329,967 B1 | 12/2001 | Little et al. |
| 6,392,235 B1 | 5/2002 | Barrett et al. |
| 6,396,976 B1 | 5/2002 | Little et al. |
| 6,424,450 B1 | 7/2002 | Goossen |
| 6,430,333 B1 | 8/2002 | Little et al. |
| 6,467,879 B1 | 10/2002 | Kubby et al. |
| 6,519,073 B1 | 2/2003 | Goossen |
| 6,570,143 B1 | 5/2003 | Neil et al. |
| 6,737,652 B2 * | 5/2004 | Lanza et al. ............ 250/363.06 |
| 6,819,463 B2 | 11/2004 | Noonan |
| 6,819,466 B2 | 11/2004 | Tayebati |
| 6,856,449 B2 | 2/2005 | Winkler et al. |
| 7,006,132 B2 | 2/2006 | Pereira et al. |
| 7,031,577 B2 | 4/2006 | Painter et al. |
| 7,235,773 B1 | 6/2007 | Newman |
| 7,251,396 B2 | 7/2007 | Larochelle et al. |
| 7,415,049 B2 | 8/2008 | Flanders et al. |
| 2002/0075990 A1 | 6/2002 | Lanza et al. |
| 2003/0058520 A1 | 3/2003 | Yu et al. |
| 2003/0122955 A1 | 7/2003 | Neidrich |
| 2003/0164814 A1 | 9/2003 | Starkweather et al. |
| 2003/0191394 A1 | 10/2003 | Simon et al. |
| 2004/0008397 A1 | 1/2004 | Noonan |
| 2004/0046123 A1 | 3/2004 | Dausch |
| 2005/0057793 A1 | 3/2005 | Starkweather et al. |
| 2005/0248827 A1 | 11/2005 | Starkweather et al. |
| 2006/0038705 A1 | 2/2006 | Brady et al. |
| 2006/0157640 A1 | 7/2006 | Perlman et al. |
| 2007/0013999 A1 | 1/2007 | Marks et al. |
| 2007/0091051 A1 | 4/2007 | Shen |
| 2008/0128625 A1 | 6/2008 | Lamadie et al. |
| 2008/0151391 A1 | 6/2008 | Zalevsky et al. |
| 2008/0259354 A1 | 10/2008 | Gharib et al. |
| 2008/0285034 A1 | 11/2008 | Gharib et al. |
| 2009/0008565 A1 | 1/2009 | Gottesman |
| 2009/0020714 A1 | 1/2009 | Slinger |
| 2009/0022410 A1 | 1/2009 | Haskell |
| 2009/0090868 A1 | 4/2009 | Payne |
| 2009/0167922 A1 | 7/2009 | Perlman et al. |

FOREIGN PATENT DOCUMENTS

| | | |
|---|---|---|
| EP | 0 318 249 A2 | 5/1989 |
| EP | 0 663 763 A2 | 7/1995 |
| EP | 1 341 025 A1 | 9/2003 |
| EP | 1 491 958 A2 | 12/2004 |
| EP | 1 494 046 A1 | 1/2005 |
| EP | 1 627 526 | 2/2006 |
| GB | 1 449 636 | 9/1976 |
| GB | 2314664 | 1/1998 |
| GB | 2 350 472 | 11/2000 |
| GB | 2 414 881 A | 12/2005 |
| GB | 2 418 028 A | 3/2006 |
| GB | 2 434 935 A | 8/2007 |
| JP | A-55-146411 | 11/1980 |
| JP | A-04-005620 | 1/1992 |
| JP | A-09-113819 | 5/1997 |
| JP | A-2003-4441 | 1/2003 |
| WO | WO 91/12502 A1 | 8/1991 |
| WO | WO 94/18582 A1 | 8/1994 |
| WO | WO 96/24032 A1 | 8/1996 |
| WO | WO 97/26557 | 7/1997 |
| WO | WO 98/46007 A1 | 10/1998 |
| WO | WO 00/17810 | 3/2000 |
| WO | WO 00/45608 A1 | 8/2000 |
| WO | WO 02/44788 A1 | 6/2002 |
| WO | WO 02/056055 A2 | 7/2002 |
| WO | WO 02/056061 A2 | 7/2002 |
| WO | WO 03/017000 A1 | 2/2003 |
| WO | WO 2004/102958 A1 | 11/2004 |
| WO | WO 2006/125975 A1 | 11/2006 |
| WO | WO 2007/045875 A1 | 4/2007 |
| WO | WO 2007/047732 A2 | 4/2007 |
| WO | WO 2007/054769 A2 | 5/2007 |
| WO | WO 2007/091051 A1 | 8/2007 |
| WO | WO 2007/121417 A2 | 10/2007 |
| WO | WO 2008/108840 A1 | 9/2008 |
| WO | WO 2008/128625 A2 | 10/2008 |
| WO | WO 2008/142543 A1 | 11/2008 |

OTHER PUBLICATIONS

Fenimore et al.; "Coded aperture imaging with uniformly redundant arrays"; *Applied Optics*; Feb. 1, 1978; pp. 337-347; vol. 17, No. 3; Optical Society of America.

Cannon et al.; "Tomographical imaging using uniformly redundant arrays"; *Applied Optics*; Apr. 1, 1979; pp. 1052-1057; vol. 18, No. 7; Optical Society of America.

Busboom et al.; "Coded aperture imaging with multiple measurements"; *J. Opt. Soc. Am. A*; May 1997; pp. 1058-1065 vol. 14, No. 5; Optical Society of America.

Gmar et al.; "Development of Coded-Aperture Imaging With a Compact Gamma Camera"; *IEEE Transactions on Nuclear Science*; Aug. 2004; pp. 1682-1687; vol. 51, No. 4; IEEE.

Monnelly et al.; "HETE Soft X-ray Camera Imaging: Calibration, Performance, and Sensitivity"; *AIP Conference Proc.*; 2003; pp. 49-55; American Institute of Physics.

Tam et al.; "Spatial-light-modulator-based electro-optical imaging system"; *Applied Optics*; Feb. 10, 1992; pp. 578-580; vol. 31, No. 5; Optical Society of America.

Sun et al.; "Method for reduction of background artifacts of images in scanning holography with a Fresnel-zone-plate coded aperture"; *Applied Optics*; Jul. 20, 2004; pp. 4214-4218; vol. 43, No. 21; Optical Society of America.

International Search Report for PCT/GB2006/001890 mailed Aug. 28, 2006.

GB Search Reports for Application No. 0510470.8 dated Aug. 16, 2005, Nov. 8, 2005 and Nov. 10, 2005.

Schaich et al., "Computer Vision for Detecting and Quantifying Gamma-Ray Sources in Coded-Aperture Images," Record of the Asilomar Conference on Signals, Systems and Computers, Oct. 30, 1994, vol. 1, Conf. 28, pp. 741-748, (XP 000533631).

Casasent at al., "Real-time deformation invariant optical pattern recognition using coordinate transformations," *Applied Optics*, Mar. 1, 1987, pp. 938-942, vol. 26, No. 5, Optical Society of America, (XP 000601745).

Mertz et al., "Fresnel Transformations of Images," *Proceedings of the Conference on Optical Instruments and Techniques*, London 1961, Ed. K.J. Habel, 1961, pp. 305-312, (XP 002432814).

Graziani et al., "Localization of GRBs by Bayesian Analysis of Data from the HETE WXM," AIP Conference Proceedings AIP USA, 2003, No. 662, (XP 002467862).

Graziani et al., "Determination of X-Ray Transient Source Positions by Bayesian Analysis of Coded Aperture Data," Oct. 8, 1997, pp. 1-6, (XP 002467863).

Gopinathan et al., "Coded apertures for efficient pyroelectric motion tracking," *Optics Express*, Sep. 8, 2003, vol. 11, No. 18, pp. 2142-2152, (XP 002467864).

Goossen et al., "Silicon Modulator Based on Mechanically-Active Anti-Reflection Layer with 1 Mbit/sec Capability for Fiber-in-the-loop Applications," *IEEE: Photonics Technology Letters*, Sep. 1994, pp. 1119-1121, vol. 6, No. 9, IEEE, (XP 000468079).

Accorsi et al., "High-Sensitivity Dynamic Coded Aperture Imaging," *2003 IEEE Nuclear Science Symposium Conference Record*, vol, 5 of 5, Oct. 19, 2003, pp. 1833-1837, vol. 13, IEEE.

Brown, "Multiplex imaging with multiple-pinhole cameras," *Journal of Applied Physics.*, Apr. 1974, pp. 1806-1811, vol. 45, No. 4, American Institute of Physics.

Wood et al., "Hybrid optics in dual waveband infrared systems," *Proc of. SPIE*, 1998, pp. 602-613, vol. 3482.

Fish et al., "Scanning singular-value-decomposition method for restoration of images with space-variant blur," *J. Opt. Soc. Am. A*, Mar. 1996, pp. 464-469, vol. 13, No. 3, Optical Society of America.

Lewis et al., "Micromachined Modulator Arrays for Use in Free-Space Optical Communication Systems," *Advanced Free-Space Optical Communications Techniques and Technologies, Proc. of. SPIE*, vol. 5614, pp. 24-30, 2004.

Moseley et al., "Microshutters Arrays for the JWST Near Infrared Spectrograph," *Proceedings SPIE, International Society for Optical Engineering*, 2004, vol. 5487, Part 2, pp. 645-652.

Kutyrev et al., "Programmable Microshutter Arrays for the JWST NIRSpec: Optical Performance," *IEEE Journal of Selected Topics in Quantum Electronics*, May/Jun. 2004, vol. 10, No. 3, pp. 652-661.

De Villiers et al.; "Positive solutions to linear inverse problems," *Inverse Problems*, 1999, pp. 615-635, vol. 15, IOP Publishing Ltd.

U.S. Appl. No. 60/726,655, filed Oct. 17, 2005 in the name of David Brady.

U.S. Appl. No. 12/278,515, filed Aug. 6, 2008 in the name of Philip Haskell.

U.S. Appl. No. 12/278,470, filed Aug. 6, 2008 in the name of Christopher Slinger.

U.S. Appl. No. 12/278,500, filed Aug. 6, 2008 in the name of Mark Mcnie et al.

U.S. Appl. No. 12/278,521, filed Aug. 6, 2008 in the name of Christopher Slinger.

U.S. Appl. No. 12/278,524, filed Aug. 6, 2008 in the name of Christopher Slinger et al.

U.S. Appl. No. 12/373,946, filed Jan. 15, 2009 in the name of Malcolm Strens.

U.S. Appl. No. 60/792,335, filed Oct. 17, 2005 in the name of David Brady.

Mar. 29, 2010 Office Action issued in U.S. Appl. No. 12/278,470.

Accorsi et al., "High-Sensitivity Dynamic Coded Aperture Imaging," IEEE, 2004, vol. 13, pp. 1833-1837.

Bertero et al., "Image Restoration Methods for the Large Binocular Telescope (LBT)," Astronomy and Astrophysics, May 30, 2000, pp. 1-15.

Cannon et al., "Coded Aperture Imaging: Many Holes Make Light Work," Optical Engineering, May/Jun. 1980, vol. 19, No. 3, pp. 283-289, (XP-001092857).

De Villiers et al., "Sub-Pixel Super-Resolution by Decoding Frames from a Reconfigurable Coded-Aperture Camera: Theory and Experimental Verification," Proc. of SPIE, 2009, vol. 7468, pp. 746806-1 to 746806-9, (XP-002558345).

Gutin et al., "Agile, Detecting and Discriminating, infrared Electo-optical System (ADDIOS) Application to Coded Aperture Imaging and Non-Imaging Sensor Systems," Proc. of SPIE, 2007, vol. 6714, pp. 671406-1 to 671406-12, (XP-002558346).

Mohan et al., "Sensing Increased Image Resolution Using Aperture Masks," CVPR, 2008, pp. 1-8, (XP-31297391).

Slinger et al., "Coded Aperture Systems as Nonconventional, Lensless Imagers for the Visible and Infrared," Proc. of SPIE, 2007, vol. 6737, pp. 67370D-1 to 67370D-10, (XP-002558347).

Rocchia et al., "A Multiplex Imaging Spectrometer for Low Energy X-Ray Astronomy," Astrophysics and Space Science, Oct. 1983, vol. 96, No. 2, pp. 361-374.

Grindlay et al., "Optimizing Wide-Field Coded Aperture Imaging: Radial Mask Holes and Scanning," Proc. of SPIE, 2004, vol. 5168, No. 1, pp. 402-410, San Diego, CA, USA, Aug. 4-7, 2003.

Dec. 23, 2009 International Search Report issued in corresponding International Application No. PCT/GB2009/001870.

Mar. 5, 2010 International Search Report issued in corresponding International Application No. PCT/GB2009/002780.

Mar. 19, 2009 Office Action issued in corresponding Application No. GB0822281.2.

Mar. 11, 2010 Office Action issued in U.S. Appl. No. 12/278,521.

Nov. 18, 2009 Office Action issued in U.S. Appl. No. 11/920,345.

May 7, 2010 Office Action issued in U.S. Appl. No. 11/920,345.

Sep. 30, 2010 Office Action issued in U.S. Appl. No. 12/278,470.

Oct. 19, 2010 Office Action issued in U.S. Appl. No. 12/278,500.

Sep. 14, 2010 Office Action issued in Japanese Patent Application No. 2008-512909 (translation).

Feb. 25, 2011 Office Action issued in U.S. Appl. No. 12/278,470.

Meng et al. "A Gamma Ray Imager Using Clustered Non-Redundant Array Coded Aperture," 2003 IEEE Nuclear Science Symposium Conference Record, vol. 2 (Oct. 2003), pp. 763-766.

\* cited by examiner

CODED APERTURE IMAGING USING SUCCESSIVE IMAGING OF A REFERENCE OBJECT AT DIFFERENT POSITIONS

This invention relates to a coded aperture imaging system and method, especially to a coded aperture imaging system having at least one reconfigurable coded mask.

Coded aperture imaging is a known imaging technique which is primarily used in high energy imaging such as X-ray or γ-ray imaging where suitable lens materials do not generally exist, see for instance E. Fenimore and T. M. Cannon, "Coded aperture imaging with uniformly redundant arrays", Applied Optics, Vol. 17, No. 3, pages 337-347, 1 Feb. 1978. It has also been proposed for three dimensional imaging, see for instance "Tomographical imaging using uniformly redundant arrays" Cannon T M, Fenimore E E, Applied Optics 18, no. 7, p. 1052-1057 (1979)

Coded aperture imaging exploits the same principles as a pinhole camera but instead of having a single small aperture uses a coded aperture mask having an array of apertures. The small size of the apertures results in a high angular resolution but increasing the number of apertures increases the radiation arriving at the detector thus increasing the signal to noise ratio. Each aperture passes an image of the scene to the detector array and so the pattern at the detector array is an overlapping series of images and is not recognisable as the scene. Processing is needed to reconstruct the original scene image from the recorded data.

The reconstruction process requires knowledge of the aperture array used and system configuration and the aperture array chosen is often coded to allow subsequent good quality image reconstruction. The processing is performed using a mathematical model of the particular array at a set location.

Recently, see U.S. patent application Ser. No. 11/920,345, it has been proposed to use a reconfigurable coded aperture mask means. The sue of a reconfigurable coded aperture mask means allows different coded aperture masks to be displayed at different times. This allows, for example, the direction and FOV of the imaging system to be altered without requiring any moving parts. Further the resolution of the imaging system can also be altered by changing the coded aperture mask displayed on the coded aperture mask means.

The pattern displayed on the coded aperture mask means is referred to herein as a coded aperture mask. At least part of the coded aperture mask is a coded aperture array. That is either the whole pattern displayed on the mask means is a coded aperture array or, as described in more detail below, only part of the pattern is a coded aperture array. The skilled person will be well of aware of the coded aperture arrays that can be displayed. For the avoidance of doubt the term aperture used herein does not imply a physical hole in the mask means but merely an area of the pattern which allows radiation to reach the detector.

As mentioned the reconfigurable mask means can display a variety of coded aperture masks having a variety of coded aperture arrays in different positions on the mask means. Knowledge of the particular array displayed and its location is used in reconstructing the scene image in the same way as for a fixed coded aperture.

For good quality images to be produced the coded aperture array used must conform closely in position, spacing etc. to the mathematical model of the array used for image reconstruction. This require a reasonably high degree of precision in positioning the coded aperture array relative to the detector array, especially with regard to in plane rotation. As the skilled person will appreciate, rotation of a coded aperture array effective changes the pattern of the array as perceived by the detector array and thus reduces the decoded image quality.

It is therefore an object of the invention to provide a coded aperture imaging system and to a method of coded aperture imaging which has a relaxed tolerance of alignment and/or has an improved image quality.

Thus according to the present invention there is provided a method of determining decoding pattern data for a coded aperture imaging apparatus having a coded aperture mask means in fixed relation to a detector array comprising the step of imaging a reference object using the coded aperture imaging apparatus and using the intensity pattern on the detector array due to the reference object to form a decoding pattern.

The reference object may be a point source such as a laser beam focused to a point with a microscope objective. In the field, a flare released at a distance from the system could be used or a retro-reflector positioned in the field of view could be illuminated with a laser. A collimated light source could also be used to effectively provide a point source at a great distance. This would be used for recording a decoding pattern that could decode the image of a distant scene.

If a coded aperture imaging (CAI) system with a particular coded aperture is used to image a point source the intensity pattern on the detector will effectively be the shadow cast by the coded aperture. This intensity pattern therefore gives the decoding pattern required for that particular coded aperture at that particular location and orientation relative to the detector array.

Thus, unlike known CAI systems which compute a theoretical decoding pattern based on a knowledge of the mask used and its location to the detector, which requires accurate alignment of the mask, the present invention relaxes the tolerances for alignment and then determines the decoding pattern by imaging a reference.

The intensity pattern on the detector array may be used directly as the decoding pattern or it may be processed to improve the image quality, for instance the contrast of the intensity pattern could be improved.

If a point source is used at the intended wavelengths of operation of the CAI apparatus then any diffraction effects caused by the apertures will be represented in the intensity pattern on the detector array. Using an intensity pattern incorporating diffraction effects may provide better image quality than using a pattern without diffraction effects or by attempting to compensate for diffraction effects in processing.

The target scene will in general have an unknown spectral content and different parts of it will have different spectra. For example, in the visible waveband, the scene would be coloured and in the thermal infra-red waveband, different parts of the scene would be at different temperatures. Decoding patterns may be recorded from point sources with a range of wavelengths or spectra, any one of which may be the optimum one to use for decoding a particular scene or for enhancing the quality of a particular region in a scene. The lack of prior knowledge of the spectrum of the target scene is thus allowed for by obtaining a selection of decoding patterns optimised for different spectral contents, and choosing the appropriate one as desired.

The diffraction effects may be so strong that the decoding pattern is not recognisable as a shadow of the mask (e.g. the arrangement of the light and dark regions in the decoding pattern do not correspond to the arrangement of the light and dark regions in the mask). However, it will be recognised by one skilled in the art that as long as one can record a modulated pattern, it will move laterally according to the positions of the light sources in the scene in the same way as a shadow of the mask, and thus can be used as a decoding pattern in exactly the same way.

Means for obtaining light sources with desired spectral content will be well known to one skilled in the art, for example, using a filter with a white light source. It would also be possible to record decoding patterns at a selection of different wavelengths which could be either monochromatic or narrow band. One can then combine these decoding patterns by simple weighted addition to obtain a decoding pattern matching that recorded with any desired spectrum, where the weights applied correspond to the weights needed to combine the different wavelength sources into the desired spectrum. This would offer a versatile route to obtain a decoding pattern for any spectrum, given a pre-recorded set of narrow band patterns.

Alternatively a theoretical pattern could be still be used as the basis for the decoding pattern. The theoretical pattern would correspond to the mask used at the intended location and orientation. By comparing the actual intensity pattern detected with the theoretical pattern any misalignment of the mask could be detected. The comparison could conveniently be performed by correlating the detected intensity pattern with the theoretical pattern. An appropriately rotated and sized theoretical pattern could then be computed and used as the decoding pattern.

The mask may be larger than the detector array. This enables the system to have a wide field of view. When the mask is illuminated by a point source, only light from part of the mask pattern will fall on to the detector. This would be sufficient to determine the position and orientation of the mask so that a theoretical decoding pattern could to be used to decode the images.

Noting that lateral offsets of the point source result in lateral offsets of the shadow of the part of the mask pattern that falls on the detector, it is possible to construct a recorded decoding pattern of the full size of the mask by stitching sub-sections together. Images are recorded for each of a set of point light source positions. For simplicity these positions could be chosen to be on a square grid. The spacing between these positions is such that there is a small overlap in the regions of the mask that casts a shadow on the detector. The task of clipping away the overlap regions and stitching the recorded images together so that they butt up to each other correctly could be performed by observation of the images. Alternatively, an automated method could cross-correlate pairs of the images, the correlation peaks so obtained indicating the best alignment of the images and the region of overlap to be clipped. Therefore the method may involve the step of successively imaging a reference object at a plurality of different positions with respect to the imaging apparatus such that radiation from a reference object reaches the detector via a different part of the coded aperture and recording the intensity pattern at the detector array for each position.

The optimum recorded decoding mask for a given object in a scene will be generated by a point source at the same distance from the mask as the object. A consequence of the recording point source and object not being at the same distance is that the decoded image will be defocused in the same way that conventional imaging systems defocus. This effect is expected to be small for distant objects, as it would be for conventional systems. It is possible to record decoding patterns with the point source at different distances, allowing the coded aperture system to be 'focused' in operation simply by choosing the appropriate decoding pattern.

The present invention therefore allows a CAI system to be built and an accurate decoding pattern determined through testing of the system. This can improve the image quality of the decoded images whilst relaxing alignment tolerances in producing a CAI apparatus.

Furthermore U.S. patent application Ser. No. 11/920,345 describes the use of non-planar masks in CAI systems. Although known CAI systems use a planar mask it has been realized that a non-planar mask having a coded aperture array could be used. This could improve the field of view of a CAI system having a reconfigurable coded aperture mask means and/or may allow the CAI apparatus to conform to the shape of the platform on which it is mounted.

Generating a theoretical decoding pattern for such a curved coded aperture array can involve significant computation. The present invention allows the decoding pattern to be determined directly without requiring any processing.

Where the coded aperture mask means is reconfigurable it may be reconfigurable to any one of several different masks, each having a different coded aperture array and/or the coded aperture array located at a different position on the mask means. In such a case the method may involve imaging a suitably located reference object with each different mask configuration and using the intensity pattern at the detector to determine a decoding pattern for each different configuration.

The present invention therefore offers a means of determining a decoding pattern by effectively recording an image of the coded aperture as seen by the detector array. Additionally or alternatively the reference object may be an object having a specific known shape. In this embodiment the unprocessed intensity pattern received at the detector array when imaging a particular reference shape is recorded. Several intensity patterns may be recorded for several different basic shapes, e.g. lines, circles, squares etc. The stored intensity patterns relating to the various shapes can be correlated with the actual intensity patterns received in use. Where there is a correlation between the reference and acquired intensity patterns this is indicative that the shape used to record that particular reference intensity pattern matches a shape in the scene contributing to the image. Thus the decoding step effectively employs correlation template matching. Instances of correlation between a stored reference pattern and a pattern acquired from the scene can be used to provide image enhancement and/or image recognition.

The reference object may be a shaped light source, for instance an array of LEDs or masked light source or could be a strongly illuminated reflective shaped object.

For both embodiments of the invention, using a point source reference object to obtain an image of the mask and use of a shaped reference object for correlation, it is obviously important that the reference object is substantially the only source of radiation from the scene at the time the intensity pattern at the detector is recorded.

The imaging of a point source reference object so as to record an intensity pattern on the detector array is effectively a calibration step. As such it could be performed once, when the CAI apparatus is assembled. Once a decoding pattern can been determined for each coded aperture configuration from the imaging of a reference object the CAI apparatus can be used without requiring further reference imaging. Therefore in another aspect of the invention there is provided a method of coded aperture imaging comprising the steps of taking a coded aperture imaging apparatus having a detector array arranged to received radiation from a scene through a coded aperture mask means, recording the intensity pattern of radiation on the detector array and processing the intensity pattern using a decoding pattern to produce a scene image, wherein the decoding pattern is based on a recorded intensity pattern of the coded aperture imaging means imaging a reference object.

In this case, preferably the reference object is a point source.

The step of recording an intensity pattern of a point source could be carried out on manufacture and assembly of the imager in laboratory like conditions or it could be performed with the imager located in use. In some instances, for instance where the imager is mounted on a platform which undergoes significant vibration or other motion and there is potential for a change in relative alignment over time it may be desirable to periodically recalibrate.

As mentioned, for distant imaging applications, the point source could be a flare in the scene or a retro-reflector illuminated by a laser. Obviously when recording an intensity pattern from a point source the intensity level of the rest of the scene should be low compared to the intensity of the point source. A wavelength specific point source could be used to ensure the intensity of the point source or the point source could have a modulated output and processing of the intensity pattern on the detector array could be used to extract the signal having a matching modulation and therefore corresponding to the point source.

Using a point source in the field of view in use can also be advantageous when imaging over long distances as it allows for atmospheric aberration correction. A point source such as a retro-reflector illuminated by a strong illumination means such as a laser could be located in the scene. Any atmospheric aberration, i.e. distortion of the optical signal, caused by the propagation of the radiation through the atmosphere would result in the point source having a distorted shape as perceived at the coded aperture imager. The intensity pattern received at the detector array will then be the intensity pattern caused by the mask being illuminated by such a distorted source. This intensity pattern can then be used as the decoding pattern for the purposes of decoding any image. An image of the distorted point source decoded using such a pattern would actually give a point-like autocorrelation peak that would be similar to an image of the undistorted point source. Therefore if a point source is located within the scene to be imaged and the intensity pattern created by that point source is used as the decoding pattern any distortions in the propagation of the radiation from the scene to the imager will be compensated for. The method may therefore comprise the step of locating the reference object within the scene to be imaged. The method may also comprise the step of decoding the image using the decoding pattern to reduce the effects of any distortion caused by the intervening medium, i.e. atmospheric aberration. The method may involve modulating the radiation from the reference object to allow the intensity pattern on the detector array due to the reference object to be determined. A plurality of reference objects may be disposed at different parts of the scene and a decoding pattern determined using each different reference object. In this way a different pattern could be used for different parts of the scene where the incident radiation will have experienced different atmospheric aberrations.

In another aspect of the invention there is provided a coded aperture imager comprising a detector array arranged to image a scene through a coded aperture mask means and a processor for decoding the intensity pattern received at the detector array to produce an image, wherein the processor has a memory storing a decoding pattern based on the intensity pattern received at the detector array when imaging a point source.

Preferably the coded aperture mask means is reconfigurable to provide different mask configurations having coded aperture arrays having different patterns and/or at different locations on the mask means and the memory stores a decoding pattern for each mask configuration, each decoding pattern based on the intensity pattern received at the detector array when imaging a point source using the respective mask configuration.

As taught in GB0510470.8 a reconfigurable coded aperture mask means can provide coded aperture masks having different fields of view. In this way the imaging system performance can be altered within a field of regard that can be many times larger without needing any macroscopic moving parts. The different coded aperture masks may be arranged such that only part of the coded aperture mask comprises a coded aperture array and the position of the coded aperture array in the mask defines the field of view. In other words only a portion of the mask means may be used to define a coded aperture array with the rest of the mask blocking radiation from reaching the detector array. Therefore the only radiation from the scene that can reach the detector array is that passing through the coded aperture array and hence the location of the coded aperture array relative to the detector array and the size of the coded aperture array will define the field of view of the system. Moving the position of the coded aperture array within the mask displayed on the mask means will alter the direction from which radiation can reach the detector array and so will alter the direction and size of the field of view. Thus the total size of the mask means defines the field of regard of the system and can be much larger than the size of a coded aperture array written to the reconfigurable mask means but the field of view can be controlled, for instance to provide scanning or to track an object in the scene.

The coded aperture mask means may also be reconfigurable to provide coded aperture masks having different resolutions. For instance different coded aperture masks could be displayed having coded aperture arrays with different effective aperture sizes and spacing. The coded aperture mask means may also be reconfigurable to provide coded aperture masks having different coded aperture arrays.

The invention will now be described by way of example only with reference to the following drawings of which.

The present invention relates to a coded aperture imaging (CAI) apparatus. CAI is based on the same principles as a pinhole camera. In a pinhole camera, images free from chromatic aberration are formed at all distances away from the pinhole, allowing the prospect of compact imaging systems, with a large depth of field. However, the major penalty is the poor intensity throughput, which results from the small light gathering characteristics of the pinhole. Nevertheless, the camera is still able to produce images with a resolution determined by the diameter of the pinhole, although diffraction effects have to be considered. The light throughput of the system can be increased by several orders of magnitude, while preserving angular resolution, by using an array of pinholes. Each detector element sees the result of the summation of contributions from the various pinholes, corresponding to each viewpoint of the scene.

Another way of understanding the operating principle of CAI is to observe that this is a purely geometric imaging technique. Light from every point in a scene within the field of regard (FOR) of the system casts a shadow of the coded aperture onto the detector array. The detector measures the intensity sum of these shadows. The coded aperture is specially designed such that its autocorrelation function is sharp with very low sidelobes. Typically pseudorandom or uniformly redundant arrays (URA) (such as described in E. Fenimore and T. M. Cannon, "Coded aperture imaging with uniformly redundant arrays", Applied Optics, Vol. 17, No. 3, pages 337-347, 1 Feb. 1978) are used where a deconvolution of the detector intensity pattern can yield a good approximation to the point distribution in the scene.

Figure 1:
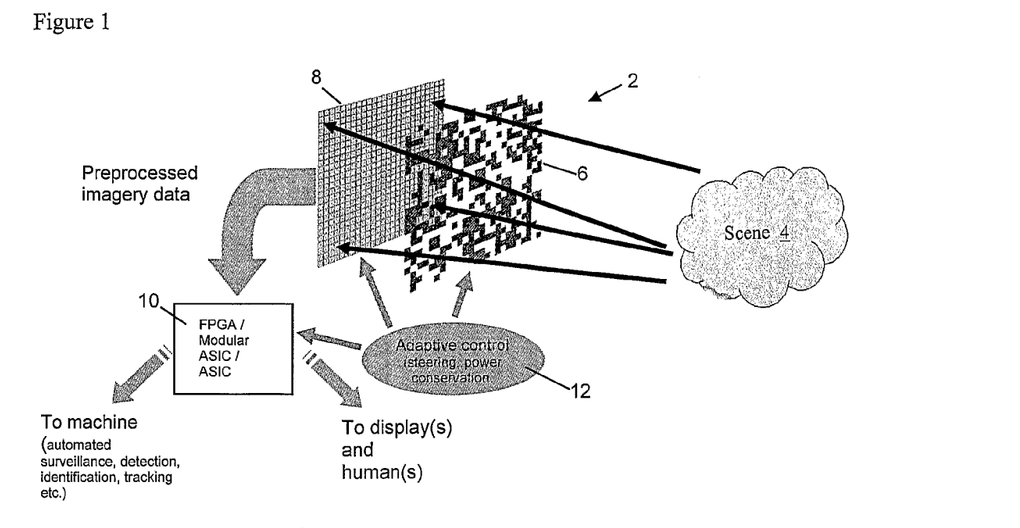
FIG. 1 shows a schematic of a coded aperture imaging system.

FIG. 1 shows schematically an example of a coded aperture imaging system, generally indicated 2. Rays of light from points in the scene 4 fall onto a particular coded aperture array 6. The coded aperture array acts as a shadow mask and therefore a series of overlapping coded images are produced on the detector array 8. At each pixel on the detector array, the intensities from the overlapping, coded images are summed. The output from the detector array 8 is passed to a processor 10 where an image of the scene can be subsequently decoded from the detector signals using a variety of digital signal processing techniques.

Recently GB0510470.8 has proposed using a reconfigurable mask means 6 to provide reconfigurable coded aperture array. The coded aperture mask means 6 is controlled by a controller 12 which controls the reconfigurable mask means to display different coded aperture masks. If only part of the coded aperture mask means displays a coded aperture array, the rest of the mask preventing radiation from reaching the detector, then the field of view of the apparatus is determined by the location and size of the coded aperture array relative to the detector, changing its position or size changes the field of view and/or resolution of the imager.

CAI therefore offers the ability to provide a compact and lightweight imaging apparatus which has a large depth of field and has a changeable field of view without requiring any moving parts.

Figure 2:
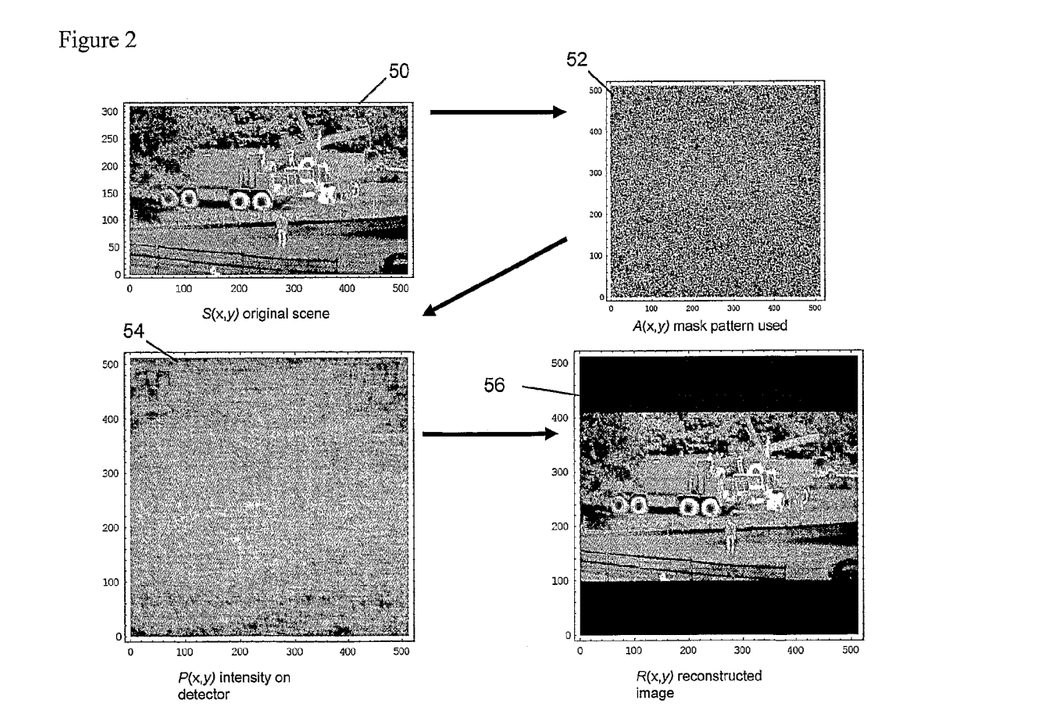
FIG. 2 shows a scene image, coded aperture array, detector intensity pattern and reconstructed image.

As mentioned above the intensity pattern formed at the detector array 8 is a series of overlapping images of the scene created by the various apertures. This intensity pattern requires decoding to construct a recognizable image of the scene. FIG. 2 illustrates a scene image 50, the coded aperture array used 52 and the resultant pixel intensity at the detector array 54. Only after suitable processing is the image recovered 56.

There are a variety of CAI decoding algorithms already available in the prior art, the majority of which have been developed for off line decoding involving the relatively low pixel count detectors associated with X-ray, y-ray and radiological imaging. For real time decoding applications, factors to be considered when choosing appropriate algorithms include optimization with signal-to-noise characteristics of the detectors to be used, mask types, synergy with efficient decoding computer architectures and adaptability to support a variety of performance options.

In the most general case, the signal D leaving the detector array 8 can be described by:

$$D(x,y)=S(x,y) \oplus A(x,y)+N(x,y) \quad (1)$$

where x,y are the lateral coordinates of the 2 dimensional signal distribution, S is the signal from the scene, A is the aperture function of the mask in the system, N is the noise introduced at the detector and $\oplus$ is the convolution operator. The object of all such algorithms is to recover part of, or the whole of, S(x,y) with as few artifacts as possible. These artifacts can be quantified by various metrics, depending upon the application for which CAI is being used. For example, human viewing of the image may require a different metric being used than for automatic (machine based) interpretation; detection, identification and/or tracking will similarly require appropriate optimisations.

For example decoding can be performed using a deconvolution:

$$S'(x,y)=\Phi^{-1}[\Phi(D(x,y))/\Phi(A(x,y))]=S(x,y)+\Phi^{-1}[\Phi(N(x,y))/\Phi(A(x,y))] \quad (2)$$

where $\Phi$ is the Fourier Transform operator. While computationally efficient, $\Phi(A(x,y))$ can have small terms (a general property of large binary arrays, for example), resulting in a noisy reconstruction. Appropriate mask design will minimize this effect. It is well known that accurate deconvolution is susceptible to noise, so detector noise may affect this algorithm more than some others.

Alternatively in a cross correlation technique, S(x,y) is decoded by correlating D(x,y) with an array G(x,y)

$$S'(x,y)=D(x,y) \oplus G(x,y)=S(x,y) \oplus A(x,y) \oplus G(x,y)+N(x,y) \oplus A(x,y) \quad (3)$$

In the simple case of G=A, and the mask design A is such that its auto correlation approximates well to a delta function, with small sidelobes. Uniform redundant arrays were developed to achieve this with small array dimensions. If this is the case, then a reasonable quality reconstruction can be achieved. However, the real positive nature of the mask functions will result in a pedestal of 0.5 times the peak value of the autocorrelation, even in the ideal case, with associated decrease in reconstruction quality compared to the ideal case deconvolution algorithm. More generally, G is chosen such that G≈A. In this case, the method is known as "balanced cross correlation" and appropriate choice of G can result in good quality reconstructions.

One thing common to all decoding methods for any CAI system however is that it is necessary to have a knowledge of the mask aperture function. Usually the mask aperture function is calculated theoretically using a knowledge of the mask and its location relative to the detector array. However this requires precise alignment of the mask. Any misalignment in orientation is particularly important as rotation of the mask can result in a different pattern being perceived by the detector.

Figure 3:
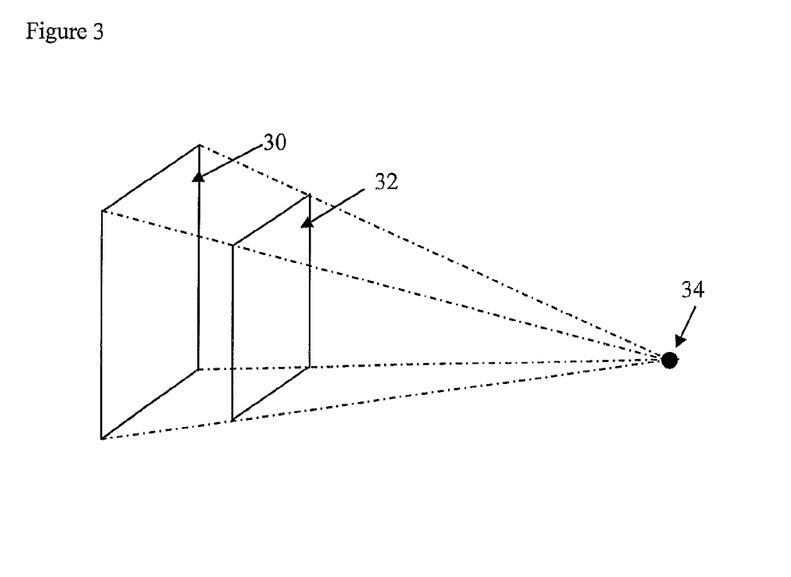
FIG. 3 shows imaging of a reference object.

The present invention therefore records an image of the actual mask by a reference object, a point source. Referring to FIG. 3 in a calibration type step the imager is arranged to image a distant point source. Detector array 30 is illuminated by point source 34 through coded aperture array 32. As the point source 34 is the only source of illumination in the scene the pattern recorded on the detector array 30 is a single shadow of the coded aperture array 32. Thus the intensity pattern recorded at the detector array gives directly the aperture pattern of the coded aperture array as perceived by the detector array.

This intensity pattern is therefore recorded and may be used directly as the mask pattern in the decoding algorithm.

Using the mask pattern directly can have the advantage that any diffraction effects of the mask are present in the recorded intensity pattern. As mentioned previously CAI is a purely geometric imaging technique. As a result, any diffraction caused by the coded aperture mask can be expected to adversely affect imaging performance. For a given wavelength, diffraction will become more significant as the mask to detector distance increases and as the mask aperture decreases. For the case of maximum angular resolution of a CAI based imager, the mask aperture spacings are similar in size to the detector pixel spacings and typically ~10 times the size of the wavelength of the light being imaged. Calculations show that very significant diffraction occurs in such situations.

Fortunately the effect of diffraction on image quality is not severe. However capturing an image of the coded aperture mask which inherently includes diffraction effects may offer advantages in image quality when processing.

The captured pattern could be processed prior to being stored for instance to improve contrast.

The wavelength of the point source 34 may be varied to record the intensity pattern on the detector array at a range of different wavelengths. For instance different point sources operating at different wavelengths could be used in turn. Alternatively the point source could be wavelength tuneable or could be a broad band source, such as a white light source in the visible spectrum, and used with appropriate pass band filters. The spectral content of the point source could be chosen to match the measured or predicted spectral content of the scene. Indeed a range of different spectral ranges could be used and the pattern for each captured. Analysis of the spectral content of the scene could then indicate which captured pattern should be used. It would also be possible to record decoding patterns at a selection of different wavelengths which could be either monochromatic or narrow band. One can then combine these decoding patterns by simple weighted addition to obtain a decoding pattern matching that recorded with any desired spectrum, where the weights applied correspond to the weights needed to combine the different wavelength sources into the desired spectrum. This would offer a versatile route to obtain a decoding pattern for any spectrum, given a pre-recorded set of narrow band patterns.

Alternatively the theoretical mask pattern could be used but the data recorded when imaging the reference object could be used to determine the degree of misalignment of the actual coded aperture array. The captured intensity pattern could be correlated with the theoretical pattern and, based on the correlation, any adjustment, e.g. to orientation, applied to the theoretical pattern. A practical method for doing is to examine the correlation between the captured intensity pattern and scaled and rotate versions of the theoretical pattern. The one yielding the highest correlation peak will indicate the scale and orientation of the captured pattern.

In several applications the coded aperture array may be larger than the detector array, or at least the projected pattern of the detector array when imaging a point source may be larger than the detector array so that the detector array can not capture the full projected pattern. When a theoretical pattern is used as the decoding pattern and the step of imaging the reference source is to allow correct orientation this does not matter as it is still possible to determine, from the part of the mask shadow which does fall on the detector array, the location and orientation of the mask relative to the detector.

Figure 4:
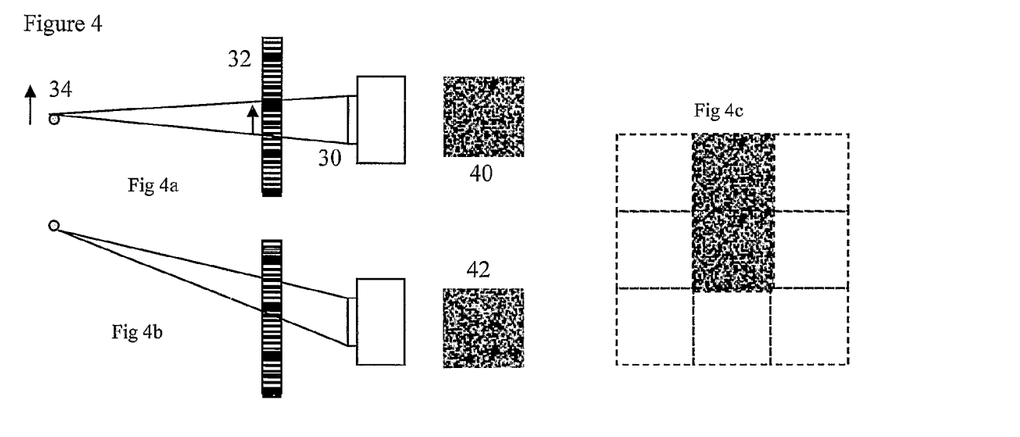
FIG. 4 illustrates the principle of imaging reference objects at different positions in a scene so as to build up a decoding pattern.

However if the actual intensity pattern is to be used it is necessary to image a reference object at different locations in the scene so as to cause different parts of the mask pattern to be illuminated on the detector array. Each different intensity pattern can be recorded and stitched together later to form a full decoding pattern. FIG. 4 illustrates this approach. FIG. 4*a* shows a point source 34 located at a first location in scene. This casts a shadow of a first part of coded aperture array 43 onto detector array 30. The resultant intensity pattern 40 is illustrated. FIG. 4*b* shows the reference object 34 located at a different part of the scene. The resultant intensity pattern 42 is the shadow of a different part of coded aperture array 32. These two intensity patterns can be stitched together to form a full pattern as illustrated in FIG. 4*c*. For simplicity the different positions for the point source lie on a square grid and the spacing between these positions is such that there is a small overlap in the regions of the mask that cast a shadow on the detector. The task of clipping away the overlap regions and stitching the recorded images together so that they butt up to each other correctly could be performed by observation of the images. Alternatively, an automated method could cross-correlate pairs of the images, the correlation peaks so obtained indicating the best alignment of the images and the region of overlap to be clipped.

The step of imaging a reference source may need only be done once when the CAI apparatus is assembled. However for some applications it may be useful to periodically re-image the reference source to ensure that the stored decoding pattern is still accurate, for instance to allow for any slight misalignment that may occur through use.

Figures 5, 5A:
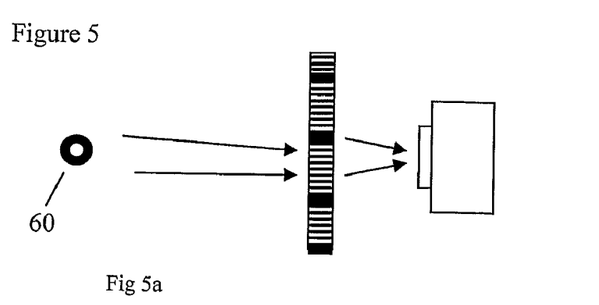
FIG. 5 illustrates the principle of using a shaped reference object.
Figure 5B:
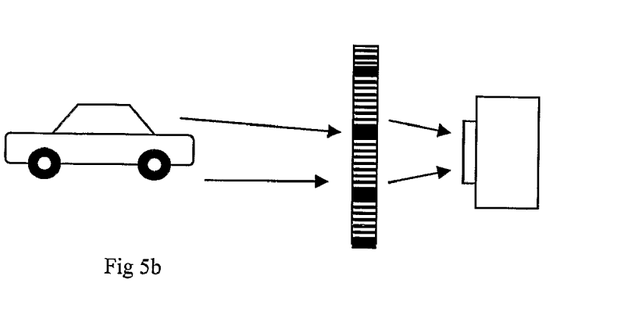
Figure 5C:
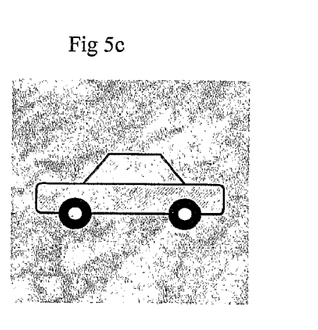
Figure 5D:
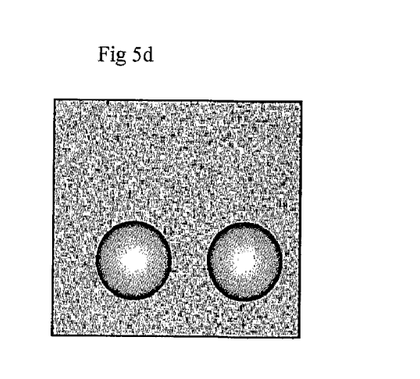

In another embodiment the point source is replaced with an object having a simple shape, such as a line or a circle. This is illustrated with respect to FIG. 5. In FIG. 5*a* a shaped reference object 60 is imaged and the intensity pattern captured. The reference object may be a light source viewed through a shaped aperture, or may be a shaped object under strong illumination etc. The intensity pattern corresponding to each shape is stored and used in decoding to perform correlation template matching. If the scene viewed later has a matching shape in it the intensity pattern recorded for that scene will correlate with the intensity pattern stored which corresponds to the reference object being circular. The presence of the object in the input scene will be indicated by a bright region in the decoded image (the correlation peak). FIG. 5*b* illustrates the scene being imaged and FIG. 5*c* shows the input scene. FIG. 5*d* illustrates the decoded image.

The application of this embodiment would be target identification and tracking. The identification of a target within a particular region of the input scene may then be used to select a mask pattern that provides an enhanced image of that particular region.

Alternatively, intensity patterns may be recorded for point sources placed at positions substantially covering a desired shape. The intensity patterns can then be added together digitally.

The present invention therefore provides a means of generating and maintaining accurate decoding patterns for a CAI system. Where a reconfigurable coded aperture mask means is used a separate decoding pattern will be determined and stored for each possible mask configuration. The present invention also allows the patterns formed by complex shaped masks to be recorded easily.

The present invention also allows for correction of atmospheric aberration which is especially useful when imaging through the atmosphere over large distances. A point source reference object is located in the scene to be viewed. This reference object may for instance be a retro-reflector which can be illuminated by a laser located near the imager.

The imager is arranged to image the field of view including the point source reference object. The radiation from the reference object may be modulated, for instance the laser illuminating the retro-reflector may be pulsed. By taking the intensity pattern on the detector array when the point source is illuminated and when it is not illuminated the intensity pattern due to the point source can be easily determined.

If there is no atmospheric aberration the intensity pattern will be a clear pattern of the mask as mentioned previously and so can be used to decode the image of the scene. However, if there is any aberration the effect will be to distort the radiation from the point source. Effectively it will appear as a distorted shape. If the intensity pattern captured from the distorted shape is used as the decoding pattern it will correlate, i.e. produce a point, for each point source in the scene. As the scene is effectively made up of a series of point sources however the result will be an undistorted image. Thus use of a reference object in the scene to determine a real time decoding pattern can compensate for atmospheric distortion.

The invention claimed is:

1. A method of coded aperture imaging (CAI) using CAI apparatus having a coded aperture mask in a fixed relation to a detector array which outputs image data in response to illumination by radiation passing from a scene via the coded aperture mask, the method comprising the steps of:
   successively imaging each of a plurality of reference objects at a plurality of different reference object positions with respect to the CAI apparatus such that radiation from the plurality of reference objects reaches the detector array via different parts of the coded aperture mask, wherein, at each of the plurality of the different reference object positions, the plurality of reference objects are each disposed at different parts of the scene, and each of the plurality of reference objects is imaged using the CAI apparatus to form a reference intensity pattern upon the detector array,
   obtaining reference image data output from the detector array for each reference object position,
   using the reference image data to derive a decoding pattern for each different reference object, and
   monitoring a scene with the CAI apparatus to produce scene image data output from the detector array and using the decoding patterns to reconstruct an image of the scene from the scene image data.

2. A method according to claim 1, wherein the reference objects are point sources.

3. A method according to claim 1 wherein the reference image data is the decoding pattern.

4. A method according to claim 1, wherein the reference objects have a spectral content and at least part of the scene being monitored in the monitoring step has a spectrum which matches that spectral content.

5. A method according to claim 1, wherein the reference objects have multiple different spectral contents for which respective reference image data and decoding patterns are derived.

6. A method according to claim 1 including the step of comparing the reference image data with a theoretical decoding pattern to determine any misalignment of the coded aperture mask with respect to the CAI apparatus.

7. A method according to claim 6 including the steps of compensating the theoretical decoding pattern for any misalignment to generate a compensated theoretical pattern and using the compensated theoretical pattern as the decoding pattern.

8. A method as claimed in claim 1 including obtaining reference image data for a reference object imaged via every part of the coded aperture array.

9. A method as claimed in claim 1 wherein the reference image data obtained for different reference object positions are combined to form the decoding pattern.

10. A method according to claim 1 wherein the coded aperture mask is reconfigurable to provide any one of several mask configurations, each mask configuration having at least one of a different coded aperture array and location at a different position on the mask, and wherein the method includes the steps of imaging a reference object with each of the mask configurations to produce respective reference intensity patterns upon the detector array and deriving a respective decoding pattern for each mask configuration.

11. A method as claimed in claim 1, wherein the reference objects consist of at least partly of a reference object of known shape.

12. A method as claimed in claim 11, wherein the reference objects have different known shapes for each of which reference image data is obtained.

13. A method as claimed in claim 1 wherein the reference objects are substantially the only source of scene radiation when the reference intensity pattern is upon the detector for output of reference image data.

14. A method as claimed in claim 1 wherein the reference objects are point sources located within the scene to be monitored.

15. A method as claimed in claim 14 including the step of modulating radiation from the reference objects to allow the reference intensity pattern to be detected.

16. A method of coded aperture imaging (CAI) comprising:
   monitoring a scene using a CAI apparatus having a detector array arranged to receive radiation from the scene through a coded aperture mask such that the radiation produces an intensity pattern on the detector array, and the detector array responds by output of image data, and
   processing the image data using decoding patterns determined by reference image data, wherein the reference image data is derived by:
      successively imaging each of a plurality of reference objects at a plurality of different reference object positions with respect to the CAI apparatus such that radiation from the plurality of reference objects reaches the detector array via different parts of the coded aperture mask, wherein, at each of the plurality of the different reference object positions, the plurality of reference objects are each disposed at different parts of the scene, and each of the plurality of reference objects is imaged using the CAI apparatus to form a reference intensity pattern upon the detector array, and
      obtaining reference image data output from the detector array for each reference object position.

17. A method as claimed in claim 16 wherein the reference objects are point sources.

18. A coded aperture imager comprising:
   a detector array for receiving an intensity pattern of radiation passing from a scene through a coded aperture mask and for output of image data in response,
   a processor for decoding the image data to produce an image, the processor having a memory storing a decoding pattern derived from a radiation intensity pattern received at the detector array by successively imaging each of a plurality of reference objects at a plurality of different reference object positions with respect to the coded aperture imager such that radiation from the plurality of reference objects reaches the detector array via different parts of the coded aperture mask, wherein, at each of the plurality of the different reference object positions, the plurality of reference objects are each disposed at different parts of the scene, and each of the plurality of reference objects is imaged using the coded aperture imager to form a reference intensity pattern upon the detector array, and obtaining reference image data output from the detector array for each reference object position.

19. A coded aperture imager as claimed in claim 18 wherein the coded aperture mask is reconfigurable to provide different mask configurations with respective coded aperture arrays each having at least one of a different pattern and a different location on the mask and the memory stores a respective decoding pattern for each mask configuration, each decoding pattern having been derived from a respective radiation intensity pattern received at the detector array when imaging a point source using the respective mask configuration.

20. A coded aperture imaging (CAI) apparatus comprising:
a coded aperture mask,
a detector array providing image data output in response to illumination by radiation passing from a scene via the coded aperture mask,
a plurality of reference objects for imaging by the CAI apparatus to form a reference intensity pattern upon the detector array and thereby to obtain output of reference image data from the detector array, wherein the reference objects are disposed at different parts of the scene, and
a processor for processing the reference image data to derive a decoding pattern using each reference object and for using the decoding patterns to reconstruct an image of a scene from image data output by the detector array in response to illumination by radiation when the CAI apparatus monitors a scene,
wherein the CAI apparatus is configured to (1) successively image each of the plurality of reference objects at a plurality of different reference object positions with respect to the CAI apparatus such that radiation from the plurality of reference objects reaches the detector array via different parts of the coded aperture mask, wherein, at each of the plurality of the different reference object positions, the plurality of reference objects are each disposed at different parts of the scene, and each of the plurality of reference objects is imaged using the CAI apparatus to form a reference intensity pattern upon the detector array, and (2) obtain reference image data output from the detector array for each reference object position.

* * * * *